United States Patent [19]
McCorkle et al.

[11] 3,733,441
[45] May 15, 1973

[54] AMBIPOLAR MICROPHONE UNIT

[75] Inventors: David P. McCorkle, South Bend, Ind.; Lee P. Hagey, Buchanan, Mich.

[73] Assignee: Electro-Voice Inc., Buchanan, Mich.

[22] Filed: June 14, 1971

[21] Appl. No.: 152,614

Related U.S. Application Data

[63] Continuation-in-part of Ser. No. 881,648, Dec. 3, 1969, abandoned.

[52] U.S. Cl. ....................179/81 B, 179/1 A
[51] Int. Cl. ....................H04q 1/00
[58] Field of Search ....................179/1 A, 81 B, 170 T, 179/1 DM, 121; 307/249

[56] References Cited

UNITED STATES PATENTS

| | | | |
|---|---|---|---|
| 3,172,960 | 3/1965 | Voyles | 179/81 B |
| 3,300,585 | 1/1967 | Reedyk | 179/1 A |
| 3,359,378 | 12/1967 | Skeer | 179/170 T |
| 3,378,649 | 4/1968 | Mawby | 179/1 DM |
| 3,299,215 | 1/1967 | Mines | 179/81 B |
| 3,305,638 | 2/1967 | Teachout | 179/1 A |
| 3,185,858 | 5/1965 | Flatten | 307/249 |

*Primary Examiner*—Kathleen H. Claffy
*Assistant Examiner*—Jon Bradford Leaheey
*Attorney*—Sidney Wallenstein et al.

[57] ABSTRACT

A microphone unit for incorporation in a telephone headset or the like including a low signal output transducer, and a polarity independent current control amplifier circuit for amplifying the transducer signals and having a pair of substantially identical parallel oppositely connected main current control devices, such as transistors, each having their load terminals arranged for controlling current flowing in a normal forward direction which is opposite to that of the other so that there will always be one fully conductive and one partially conductive or nonconductive path across the microphone unit terminals independently of the polarity of the D.C. current to be modulated by the microphone unit. Drive circuit means energized by the voltage on the telephone lines applied to the microphone unit terminals are provided to receive the transducer signals and amplify the same before being applied to the control terminals of the current control devices regardless of the polarity of the energizing voltage.

16 Claims, 11 Drawing Figures

Inventors
David Paul McCorkle
Lee Preston Hagey
By: Wallenstein, Spangenberg, Hattis & Strampel Attys Inventors
David Paul McCorkle
Lee Preston Hagey
By: Wallenstein, Spangenberg, Hattis & Strampel Attys.

Inventors
David Paul McCorkle
Lee Preston Hagey by: Wallenstein, Spangenberg, Hattis & Strampel
Attys.

AMBIPOLAR MICROPHONE UNIT

This application is a continuation-in-part of application Ser. No. 881,648 filed Dec. 3, 1969 now abandoned.

This invention relates generally to microphone units having particular, but not their only utility, in telephone handsets where they replace the usual carbon microphone unit.

Where it is desirable to utilize a voltage generating transducer instead of the commonly used relatively unstable carbon microphone in a telephone handset or the like, the need for an amplifier to duplicate the variable resistance characteristics of the carbon microphone poses problems, particularly where, as is usually the case, the D.C. voltage on the telephone lines can have either polarity and can drop to very low levels, such as where the telephone handset involved is located at the end of a pair of long telephone lines or where a conference call is involved.

It would appear that the problem of operating the transducer amplifier with voltage of either polarity could be overcome by connecting the load terminals of the transistor or other current control device of the output stage of the amplifier to the telephone lines through a rectifier bridge circuit. However, this was found to be unsatisfactory in those not infrequent cases where the voltage on the telephone lines drops to a very low value like one or two volts, since the bridge rectifiers drop the voltage even further to a level at which the amplifier cannot operate satisfactorily. (The voltage drop across germanium rectifiers is about 1 volt and that across silicaon rectifiers is about 1½ volts). The use of a bilateral transistor (i.e. a single transistor having symetrical conducting characteristics so the emitter and collector thereof are interchangeable) has been proposed, but such a transistor is unsatisfactory because of low gain inherent in the symmetrical characteristics thereof.

Accordingly, an object of this invention is to provide a microphone unit for telephone handsets or the like which operates reliably when connected across communication lines supplying energizing voltage to the microphone unit and under circumstances when the energizing voltage can have either polarity and can drop to exceedingly low levels. Another object of the invention is to provide a telephone microphone unit or the like as described, and preferably one including a noise cancelling dynamic transducer, which duplicates fairly closely the characteristics of a telephone carbon microphone unit so it can be used in place thereof in communication systems originally designed for use with such a microphone unit.

Another object of the invention is to provide a microphone unit as above described which uses high gain transistors.

A further object of the invention is to provide a microphone unit as above described which is of minimum complexity and cost.

Briefly, for telephone application, the microphone unit is constructed to fit within the mouthpiece portion of a telephone handset so that it can replace the present carbon microphone. The transducer device used in the microphone unit preferably is a low signal output, dynamic, noise eliminating transducer having the output thereof connected preferably to the control electrode of a driver amplifier current control device, like a transistor, which amplifies the output of the transducer. The driver amplifier applies amplified current or voltage to the control electrodes of a pair of parallel, reverse connected, main power amplifier current control devices, such as transistors or the like, having therein load terminals connected preferably directly across the input terminals of the microphone unit so there are no substantial voltage dropping elements like rectifiers or resistors between the current control device and the input terminals. In one form of the invention, the load terminals of the driver amplifier current control device are energized from the input terminals independently of the polarity of the voltage thereon by connecting one of the load terminals thereof to the junction of a pair of rectifiers connected in series opposed relation between the input terminals of the microphone unit. Since these rectifiers are not connected to the load terminals of the main amplifier current control devices, the total voltage of the telephone lines, however reduced it may be, will be applied across the load terminals of the main amplifier current control devices, one of which is operating to provide its maximum effect under the voltage conditions involved.

In accordance with a much improved simplified form of the invention, when all the current control devices are ordinary unsymmetrical function transistors or transistor-like devices. The power transistors are NPN and PNP function transistors, with their emitter and collector respectively connected to the same input terminals of the microphone unit. The emitter and collector of the driver transistor are coupled between the bases of the power transistors in a direction to carry the emitter to the base drive current of the power transistor having its emitter and collector coupled to the proper polarity for maximum collector current. The base to collector junction of the other power transistor acts as a steering rectifier to provide circuit continuity to the input terminals of the microphone unit to which the power transistors are connected. This circuit does not require the rectifier and other circuit elements needed for operation of the first described circuit.

The above and other objects, advantages and features of this invention will be more fully realized and understood from the following detailed description when taken in conjunction with the accompanying drawings wherein like reference numerals throughout the various views of the drawings are intended to designate similar elements or components.

Figures 1, 2, 3, 4, 5:
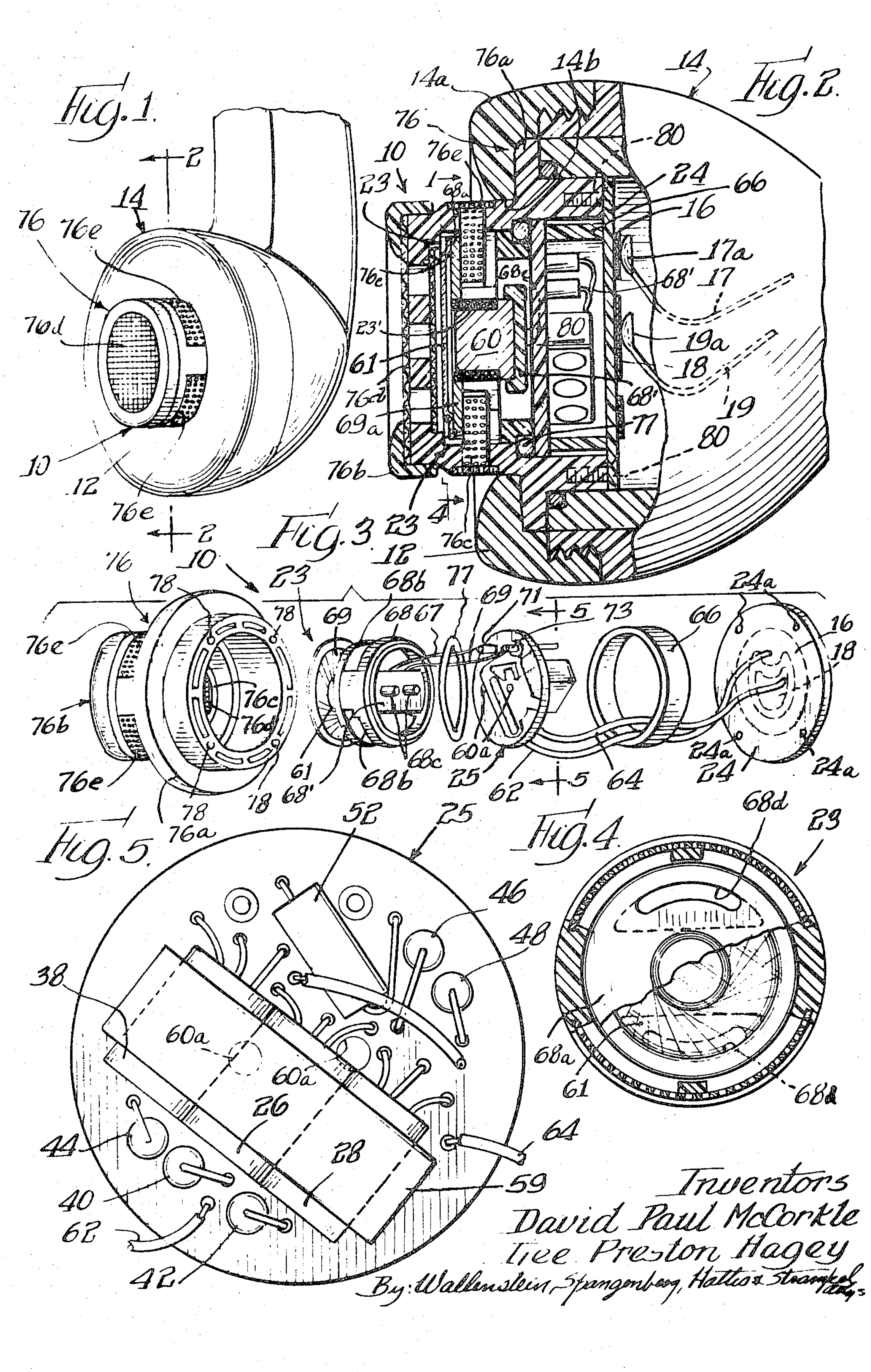
FIG. 1 illustrates a fragmentary perspective view of the mountpiece portion of a telephone handset in which is incorporated the microphone unit of this invention.
FIG. 2 is a sectional view taken along section line 2—2 of FIG. 1, showing the microphone unit mounted in the mouthpiece portion of the telephone handset of FIG. 1.
FIG. 3 is an exploded view of the microphone unit of this invention as shown in FIGS. 1 and 2.
FIG. 4 is a sectional view, partly broken away, of the diaphragm portion of the microphone unit, as seen along section line 4—4 of FIG. 2.
FIG. 5 is an enlarge elevational view of the circuit board portion of the microphone unit.

Referring now to FIGS. 1 and 2, the microphone unit of this invention is there designated by reference numeral 10 and is shown mounted in the mouthpiece portion 12 of a telephone handset 14. The microphone unit 10 is preferably adapted to be inserted in a conventional telephone handset by replacing the existing perforated threaded cover with a similar threaded cap 14*a* which has one large central opening 14*b* through which projects a portion of the microphone unit 10 to be described which replaces the usual carbon microphone unit located behind the cover. The microphone unit 10 has a pair of energizing input terminals 16 and 18 which are electrically coupled to a corresponding pair of telephone lines 17 and 19 having spring contacts 17*a* and 19*a* respectively aligned and contacting energizing current input terminals 16 and 18. The illustrated microphone unit includes a dynamic noise eliminating microphone assembly 23 which produces a low level signal voltage which is to modulate the D.C. current passing through the telephone lines 17 and 19 to the same extent as the carbon microphone it replaces. The input terminal 16 may be an annular coating of conductive material coated on the back side of an insulating disk 24, and the input terminal 18 may be a coating of conductive material on the back side of the insulating disk inwardly of the coating 16. This is a conventional microphone terminal arragnement for telephone handsets.

Figures 6, 7, 8:
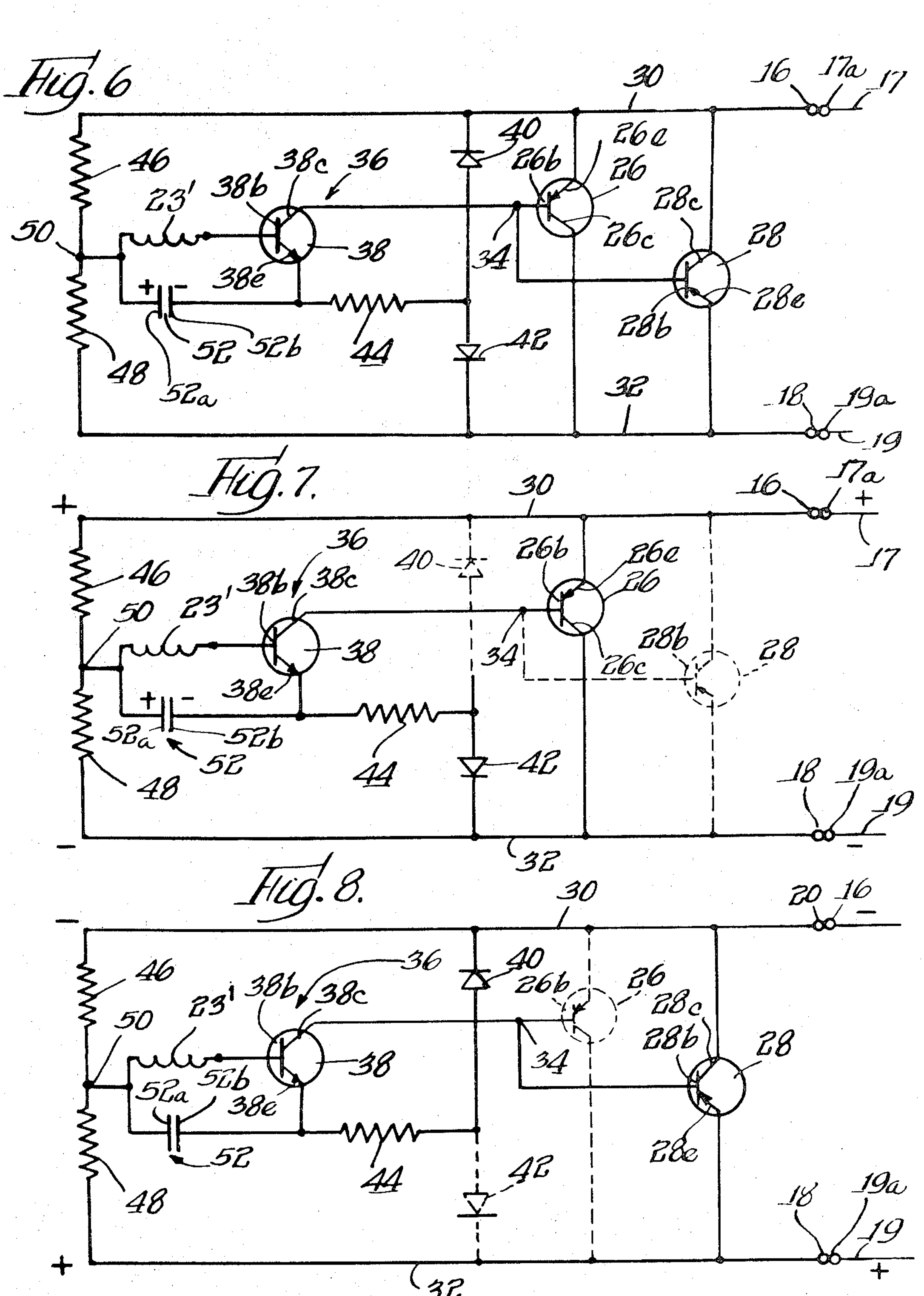
FIG. 6 is a schematic circuit diagram of one form of the invention usable in the microphone unit shown in FIGS. 2–5.
FIG. 7 is the schematic diagram of FIG. 6 showing in solid lines the most active portion of the microphone unit when the D.C. voltage input thereof has one polarity.
FIG. 8 is the schematic diagram of FIG. 6 showing in solid lines the most active portions of the microphone unit when the D.C. voltage input thereof has the opposite polarity.

As previously indicated, the polarity of the D.C. voltage on the telephone lines 17 and 19 varies from installation to installation and during the normal course of making a telephone call and so it is necessary that the microphone unit 10 function at a low voltage of either polarity. FIG. 6 illustrates the novel microphone and amplifier circuit of the microphone unit which operates well with low or normal voltages of either polarity. The amplifier circuitry is on a printed circuit board 25 shown in FIGS. 2–4.

The exemplary amplifier circuit shown in FIG. 6 shows a pair of identical unsymmetrical PNP power transistors 26 and 28 with their emitter and collector electrodes (referred to as load terminals) connected in reverse parallel relation directly across circuit busses 30 and 32 leading to the energizing input terminals 16 and 18, so there is practically no voltage drop between the input terminals and the power transistors. Only one of the power transistors 26 and 28 at any given time connected for operation in its normal forward direction where it has its maximum conductivity. A PNP transistor is connected for operation in a normal forward direction when its emitter and collector are coupled respectively between positive and negative terminals. The other power transistor is then connected for operation in a less conductive or non-conductive state.

The base 26*b* and 28*b* of transistors 26 and 28, respectively, are connected in common to a circuit point 34 which is electrically coupled to the output of a driver amplifier circuit 36. The driver amplifier circuit 36 preferably includes a NPN transistor 38 (when the power transistors 26 and 28 are PNP transistors) which has its base 38*b* connected with a transducer 23′ (shown as a coil of the dynamic transducer). The driver transistor 38 has its collector 38*c* connected directly to the circuit point 34 and its emitter 38*e* electrically connected through a current limiting resistor 44 to the juncture of the anodes of a pair of rectifiers 40 and 42 connected in series opposed relationship between the busses 30 and 32 to which the rectifier cathodes are respectively connected. It should be apparent that the emitter and collector 38*e* and 38*c* of driver transistor 38 are coupled to the busses 30 and 32 through the base circuit of the power PNP transistor 26 or 28 having its emitter and collector respectively coupled between positive and negative busses, and the rectifier connected to the negative bus. FIG. 7 shown the power transistor 26 and rectifier 42 in fully conductive states and rectifier 40 in a nonconductive state when busses 30 and 32 are respectively positive and negative. FIG. 8 shows the power transistor 28 and rectifier 40 in fully conductive states and rectifier 42 in a nonconductive state when busses 30 and 32 are respectively negative and positive.

To provide a filtered bias on the base electrode 38*b* of the driver transistor 38, a capacitor 52 is connected between the transducer coil 23′ and the emitter 38*e* of the driver transistor 38 with the capacitor plate 52*a* nearest the transducer coil 23′ preferably connected to the juncture of a pair of equal value isolating resistors 46–48 connected in series across the busses 30 and 32. With the circuitry just described, the right hand plate 52*b* of the capacitor coupled to the emitter 38*e* of the driver transistor will be negative with respect to the other plate 52*a* independently of the polarity of the voltage on the busses 30 and 32.

When the transducer coil 23′ is energized by sound waves, a modulated current path is formed through the base-emitter junction of the conducting power transistor 26 or 28 and the collector-emitter circuit of the driver transistor 38, the resistor 44 and the rectifier 40 and 42 which is forwardly biased. Only a low voltage and low current are needed to operate the driving transistor 38. Thus, the voltage drop across the rectifier 40 or 42 need not seriously impair the ability of the driver transistor 38 to have a significant effect on the conducting power transistor 26 or 28 which is fully energized by the connection of its emitter and collector directly across busses 30 and 32.

Figure 9:
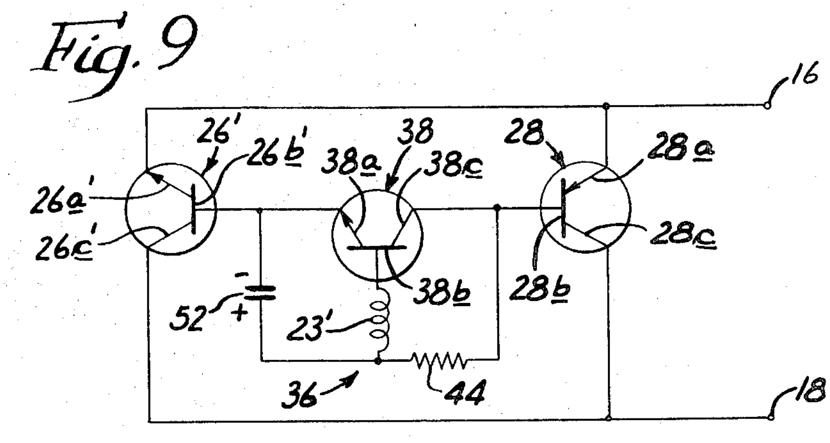
FIG. 9 is a schematic circuit diagram of a preferred simplified form of the invention usable in the microphone unit of FIGS. 2–5.
Figure 10:
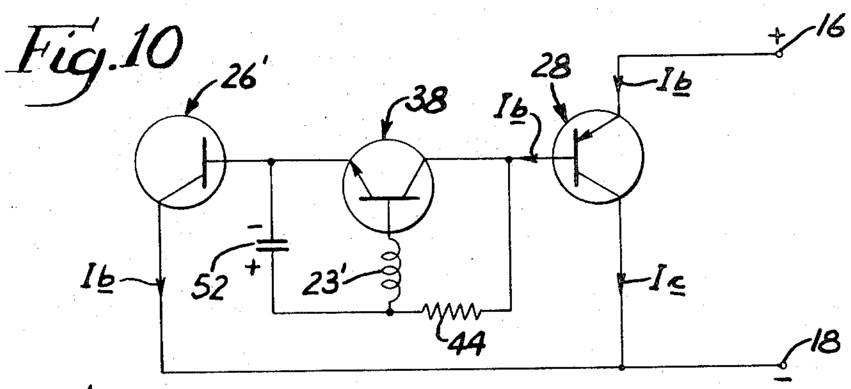
FIG. 10 shows the principal current carrying portions of the circuit of FIG. 9 where the D.C. voltage input thereto has one polarity.
Figure 11:
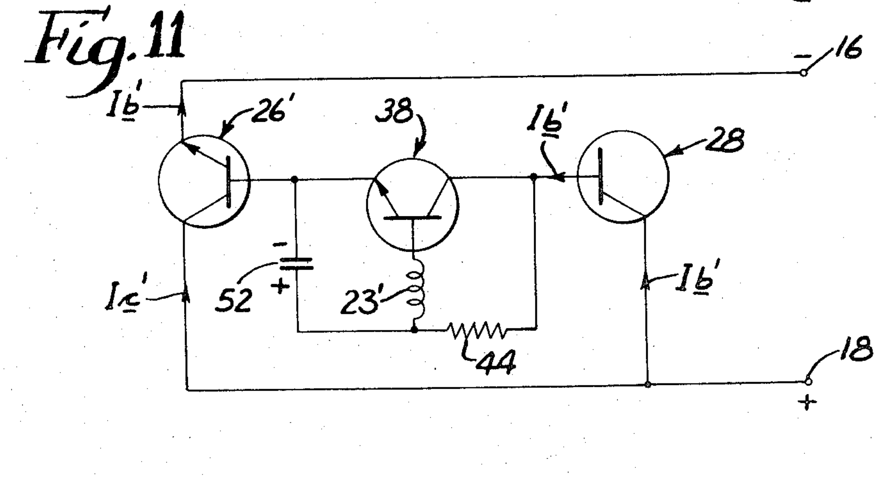
FIG. 11 shows the principal current carrying portion of the circuit of FIG. 9 where the D.C. voltage input thereto has the opposite polarity.

Reference should now be made to FIG. 9 through 11 which illustrates a much improved circuit than that shown in FIG. 6 in that it eliminates the need for the rectifiers 40–42 and the resistors 46–48, resulting in a much simpler, less costly, and more reliable circuit. Also, instead of using a pair of unsymmetrical, matched power transistors of the same type, such an PNP transistors shown in FIG. 6, the circuit of FIG. 9 uses a pair of unsymmetrical power transistors of opposite type. Thus, in addition to the PNP transistor power transistor 28, a NPN power transistor 26′ is used, with the emitters 28*a* and 26*a*′ thereof connected to the same input terminal 16 or 18 and the collectors 28*c* and 26*c*′ connected to the other input terminal 18 or 16. The driver transistor 38 has its emitter 38*a* and collector 28*c* respectively connected between the bases of the power transistors 26′ and 28. In the case where the driver transistor 38 is a NPN transistor as shown, the collector 38*c* of the driver transistor 38 is connected to the base 28*b* of the PNP power transistor 28 and the emitter 38*a* thereof if connected to the base 26*b*′ of the NPN power transistor 26′.

The biasing capacitor 52 is connected between the emitter 38*a* of the driver transistor 38 and one terminal of the transducer 23; the other terminal of which is connected to the base 38*b* of the driver transistor 38 as in the case of the previously described circuit. The biasing resistor 44 is connected between the juncture of the capacitor 52 and the transducer 23′ and the collector side of the driver transistor 38.

With the circuit arrangement just described, when the input terminal 16 is positive with respect to the other input terminal 18 as shown in FIG. 10 (which shows only those portions of the circuit which will carry appreciable current), all portions of the circuit of FIG. 9 carry such current except the emitter of the power transistor 26′. In effect, the PN junction of the NPN power transistor 26′ acts as a steering rectifier to complete a path for driving current circuit for the power transistor 28, which path extends through emitter to base junction of the power transistor 28, the emitter and collector junction of the driver transistor 38 and the base to collector junction of the driver transistor 38. The collector and base current of the power transistor 28 is indicated in FIG. 10 respectively by arrows Ic and I*b*.

When the input terminal 16 is negative with respect to the input terminal 18, as shown in FIG. 11, (which shows only those portions of the circuit carrying appreciable current), all portions of the circuit of FIG. 9 carry such current except the emitter of the power transistor 28. In such case, the NP junction of the PNP power transistor 28 acts as a steering rectifier to complete a path for the drive current of power transistor 26′, which path extends through the oscillator and base junction of the power transistor 28, the collector and emitter of the driver transistor 38 and the base to emitter junction of the power transistor 26′.

It is apparent that the capacitor 52 charges to a voltage of the same proper polarity for biasing the driver transistor 38 independently of the polarity of the voltages on the input terminals 16 and 18.

Referring now to FIGS. 2, 3 and 5, the electrical components of the circuit shown in FIG. 6 are mounted on the rear side of the circuit board 25. The transistors are shown mounted within a heat sink 59 which also serves as a mounting bracket for the transistors. The particular arrangement of the electronic components can take any form as desired.

The printed circuit board 25 is sandwiched between a compressible O-ring 77 and a cylindrical spacer member 66 into which extends the various circuit components mounted on one side of the circuit borad 25. The cylindrical spacer member 66, in turn, is sandwiched between the printed circuit board 25 and the insulating disk 24 containing the aforesaid input terminals 16 and 18. Insulated conductors 62 and 64 extend between terminals on the printed circuit borad 25 and the input terminals 16 and 18 on the insulating disk 24. The conductors 62 and 64 form an extension of the aforementioned busses 30 and 32 previously described in connection with the circuit of FIG. 6 through 8.

The aforementioned O-ring 77 is supported around the reduced rear end portion of a hollow cylindrical frame 68 of insulating material forming part of the microphone assembly 23. The frame 68 has a cross-arm 68′ from which extends a pair of rearwardly extending pins 68*c*—68*c* which fit positioning sockets 60—60*a* in the printed circuit board 25. A circular front wall 69 made of a magnetizable metal is provided which has attached thereto a permanent magnet 60. The front wall 69 has an annular slot 69*a* into which extends for axial movement the transducer coil 23′ carried by a diaphragm 61 which is mounted for movement axially of the front wall 69. A voltage is generated in the transducer coil 23′ as the diaphragm 61 is vibrated by sound waves in the well-known manner. A pair of wires 67 and 69 extend between the coil 23′ and input terminals 71 and 73 on the printed circuit board 25.

The microphone assembly 23*a*, illustrated is a noise-eliminating microphone which generates a voltage only for sound waves emanating directly in front of the microphone assembly. To this end, the frame 68 has side ports 68*b*—68*b* positioned behind the front wall 68a and arcurate slots 68*d*—68*d* are formed in the front wall 68*a* to permit sound entering the side ports 68*b*—68*b* to reach the rear of the diaphragm to oppose the effect of sound waves striking the front of the diaphragm 61. Unlike remotely generated sound waves, sound waves originating immediately in front of the diaphragm will have a substantially greater effect on the front of the diaphragm 61 than on the rear thereof.

The assembly consisting of the microphone assembly 23, the printed circuit board 25, the associated O-ring 77 and the cylindrical spacer member 66 fits within a main housing 76 made of insulating synthetic plastic material or the like. The main housing 76 has intermediate the ends thereof a flange 76*a* which is engaged by the threaded cap 14*a* of the mouthpiece portion of the telephone handset 14 to retain the same in place. The main housing 76 has a front end portion 76*b* which projects through the aforementioned opening 14*b* of the threaded cap 14*a*. As best shown in FIG. 2, the peripheral portion of the diaphragm 61 abuts an annular shoulder 76*c* of the projecting front end portion 76*b* of the main housing 76. The main housing 76 has at the very front end thereof a perforated wall 76*d* into which the user speaks. The projecting front end portion 76*b* of the main housing 76 also has groups of laterally facing sound openings 76*e* which are in alignment with the side slots 76*b*—76*b* of the microphone frame 68 so that the remotely generated sound waves can gain access to the rear of the diaphragm 61 in the manner previously described.

The rear end of the main housing 76 is closed off by the insulating disk 24 secured to the rear end of the housing 76 by screws 80 passing through openings 24*a* in the insulating disk 24 and threading into openings 78 in the main housing 76.

It should be understood that the present invention has a particular, but not its only, utility when mounted in telephone handsets and provides an extremely effective microphone unit usable with communication lines where the voltage can be of either polarity and can drop to an exceedingly low value.

It should be understood that numerous modifications may be made in the most preferred form of the invention just described without deviating from the broader aspects of the invention.

We claim:

1. A microphone unit to be connected across a pair of communication lines through which D.C. current flows in either direction, which current is to be modulated by said microphone unit, said microphone unit comprising: a low signal level generating microphone transducer for generating low level electrical signals from sound waves impinging thereon, and an amplifier circuit energizable by D.C. current flowing in either direction through said communication lines and responsive to said transducer signals, said amplifier circuit comprising: a pair of energizing current input terminals to be connected across said pair of communication lines; a pair of main current control devices each having load terminals between which current flows more readily in one direction therethrough and a control terminal for rendering said load terminals readily conductive when driven by a current or voltage of a given direction or polarity, said load terminals of said main current control devices being connected across said energizing current input terminals so more current will flow through one main current control device when the voltage on the communication lines is of one polarity and more current will flow in the other current control device when the voltage on the communication lines is of the other polarity; and a driver current control device means used in common with said main current control devices and having load terminals between which current flows more readily in one direction therethrough and a control terminal connected to the output of said transducer for varying the current through the latter load terminals in response to said transducer signals; and circuit-forming means establishing a circuit with the load terminals of said driver current control device and the control terminals of said main current control devices to form a path for driving the control terminal of the main current control device which has its load terminals connected to a voltage on said input terminals of a polarity to effect conduction between the load terminals in the direction where current flow is a maximum.

2. The microphone unit of claim 1 wherein said main current control devices are junction power transistors of the same type, and said driver current control device is a junction transistor.

3. The microphone unit of claim 1 wherein said main current control devices are respectively PNP and NPN junction power transistors each having their emitters connected to the same one of said input terminals and their collectors connected to the other input terminal of the microphone unit, the connections between said emitters, collectors and input terminals being free of electrical components having any significant voltage dropping resistance.

4. The microphone unit of claim 3 wherein the driver current control device means is a transistor whose emitter and collector are coupled between the bases of the power transistors in a direction to carry the emitter to base drive current of the power transistor having its emitter and collector coupled between the input terminal having the proper relative polarity for maximum collector current, whereby the base to collector junction of the other power transistor acts as a steering rectifier to provide circuit continuity to one of the input terminals of the microphone unit.

5. The microphone unit of claim 4 wherein there is provided a bias voltage developing capacitor, said low signal level generating microphone transducer is connected between the base of said driver transistor and one plate of said capacitor whose other plate is connected to the emitter of the driver transistor, and there is provided a bias voltage coupling resistor connected between the junction of said low signal level generating microphone transducer, and said capacitor and the collector of the driver transistor, whereby a bias voltage is developed across said capacitor which set the proper operating condition of said driver transistor.

6. The microphone unit of claim 1 wherein said driver current control device means comprises a driver current control device used in common by said main current control devices and having one of its load terminals coupled to the control terminals of both of said main current control devices and the other load terminal coupled to the juncture of a pair of rectifiers which are connected in series in an opposite sense across said input terminals.

7. The microphone unit of claim 6 wherein there is provided a biasing circuit for said main current control device driver means including a bias voltage developing capacitor coupled in series with said transducer between the control terminals and the other load terminal of said current control driver device coupled to said rectifiers, the plate of said capacitor nearest the control terminal of said current control drive device being coupled through separate voltage isolating elements to said input terminals wherein said capacitor is charged to the same voltage through one of said rectifiers and the non-corresponding voltage isolating element independently of the polarity of the voltage on said input terminals.

8. The microphone unit of claim 7 wherein each of said current control devices is a transistor.

9. The microphone unit of claim 1 wherein the connection of said load terminals of said main current control devices to said input terminals is a direct connection free of eletrical components having any significant voltage dropping resistance.

10. The microphone unit of claim 1 further including a biasing voltage circuit for said current control device driver means connected across said input terminals and coupled to the control terminal means of said driver current control device means.

11. The microphone unit of claim 1 sized and shaped to be mounted within the mouthpiece portion of a telephone handset for connection to the terminating ends of a pair of communication lines to be connected to said input terminals.

12. The microphone unit of claim 3 sized and shaped to be mounted within the mouthpiece portion of a telephone handset for connection to the terminating ends of a pair of communication lines to be connected to said input terminals.

13. A telephone handset having a mouthpiece housing, a microphone unit mounted within said mouthpiece housing, said microphone unit including: a microphone transducer in the front of said mouthpiece housing for generating a low signal level voltage; a printed circuit board assembly mounted behind said transducer and forming a polarity insensitive amplifier circuit, said printed circuit board assembly having energizing current input terminals for connection to a pair of telephone communication lines and including a pair of main current control devices each having load terminals between which current flows more readily in one direction therethrough and a control terminal for rendering said load terminals readily conductive when driven by a current or voltage of a given direction or polarity, said load terminals of said main current control devices being connected across said energizing current input terminals so more current will flow through one main current control device when the voltage on the communication lines is of one polarity and more current will flow in the other current control device when the voltage on the telephone lines is of the other polarity, a driver current control device used in common with said main current control devices and having load terminals between which current flow more readily in one direction therethrough, and a control terminal means connected to the output of said transducer for varying the current through the latter load terminals in response to said transducer signals, and circuit-forming means establishing a circuit with the load terminals of said driver current control device and the control terminals of said main current control devices to form a path for driving the control terminal of the main current control device which has its load terminals connected to a voltage on said input terminals of a polarity to effect conduction between the load terminals in the direction where current flow is a maximum.

14. The telephone handset of claim 13 wherein said microphone transducer is a background noise eliminating microphone having a movable diaphragm mounted at its periphery to a microphone support frame, said support frame having apertures formed therein to allow remotely generated sound waves to enter the support frame and reach the rear of said diaphragm to the same extent as such sound waves are present at the front of said diaphragm to cancel the effects of such remotely generated sound waves, sound waves coming substantially immediately from the front of said microphone being effective to move said diaphragm.

15. The telephone handset of claim 13 wherein said driver current control device has one of its load terminals coupled to the control terminals of both of said main current control devices and the other load terminal coupled to the junctures of a pair of rectifiers which are connected in series in an opposite sense across said input terminals.

16. The telephone handset of claim 13 wherein said main current control devices are respectively PNP and NPN junction power transistors each having their emitters connected to the same one of said input terminals and their collectors connected to the other input terminal of the microphone unit, the connections between said emitters, collectors and input terminals being free of electrical components having any significant voltage dropping resistance.

* * * * *